US007673250B2

(12) United States Patent
Taylor

(10) Patent No.: US 7,673,250 B2
(45) Date of Patent: *Mar. 2, 2010

(54) SYSTEMS AND METHODS FOR A DIMMABLE USER INTERFACE

(75) Inventor: Thomas H. Taylor, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 504 days.

This patent is subject to a terminal disclaimer.

(21) Appl. No.: 11/251,284

(22) Filed: Oct. 14, 2005

(65) Prior Publication Data

US 2006/0036963 A1 Feb. 16, 2006

Related U.S. Application Data

(63) Continuation of application No. 11/205,675, filed on Aug. 17, 2005, which is a continuation of application No. 10/067,667, filed on Feb. 4, 2002, now Pat. No. 6,981,227.

(51) Int. Cl.
*G06F 3/048* (2006.01)
*G06F 3/00* (2006.01)
*G09G 5/00* (2006.01)

(52) U.S. Cl. .................. 715/768; 715/716; 715/719; 715/783; 715/790; 345/619; 345/629; 725/37; 725/38; 725/39; 725/56; 725/61

(58) Field of Classification Search ................ 715/768
See application file for complete search history.

(56) References Cited

U.S. PATENT DOCUMENTS 5,283,560 A * 2/1994 Bartlett ...................... 715/729
5,651,107 A * 7/1997 Frank et al. ................ 715/768
5,652,630 A * 7/1997 Bertram et al. ............. 348/734
6,419,137 B1 * 7/2002 Marshall et al. ............ 225/41
6,429,883 B1 * 8/2002 Plow et al. ................. 715/768
6,515,680 B1 * 2/2003 Hendricks et al. .......... 715/716
6,587,118 B1    7/2003 Yoneda
6,661,426 B1 * 12/2003 Jetha et al. ................. 345/629
2001/0012022 A1 * 8/2001 Smith ........................ 345/768
2005/0193337 A1 * 9/2005 Noguchi et al. ............ 715/542

OTHER PUBLICATIONS

Office Action dated Aug. 3, 2004 cited in U.S. Appl. No. 10/067,667.
Office Action dated May 25, 2005 cited in U.S. Appl. No. 10/067,667.
Office Action dated Jul. 21, 2005 cited in U.S. Appl. No. 10/067,667.
Notice of Allowance dated Aug. 24, 2005 cited in U.S. Appl. No. 10/067,667.
Office Action dated Feb. 24, 2009 cited in U.S. Appl. No. 11/205,675.

* cited by examiner

*Primary Examiner*—Kieu Yu
*Assistant Examiner*—Yongjia Pan
(74) *Attorney, Agent, or Firm*—Workman Nydegger

(57) ABSTRACT

Systems and methods for a dimmable user interface. A user interface is simultaneously displayed with video content or other data in the same window of a display device. The user interface has a level of transparency that is user adjustable. The user can thus make the user interface either more or less visible with respect to the video content. At the same time, the video content is correspondingly made less or more visible. Each item included in the user interface may also have a level of transparency that can be adjusted independently of the level of transparency of the user interface.

15 Claims, 3 Drawing Sheets

SYSTEMS AND METHODS FOR A DIMMABLE USER INTERFACE

CROSS-REFERENCE TO RELATED APPLICATIONS

This application is a continuation of application Ser. No. 11/205,675, filed Aug. 17, 2005, and entitled "SYSTEMS AND METHODS FOR A DIMMABLE USER INTERFACE", which is a continuation of application Ser. No. 10/067,667, filed Feb. 4, 2002, and entitled "SYSTEMS AND METHODS FOR A DIMMABLE USER INTERFACE", both of which are incorporated here by reference.

BACKGROUND OF THE INVENTION

1. The Field of the Invention

The present invention relates to a dimmable user interface. More particularly, the present invention relates to systems, methods and computer program products for selectively dimming a user interface to allow for simultaneous display of the user interface with other content and more particularly to simultaneously displaying the user interface and a television program in the same window.

2. Background and Relevant Art

Today, people are able to access and surf the Internet using, for example, a television set and a set top box. These set top boxes typically require minimal computer knowledge yet they provide users with many of the same advantages that are attainable over traditional computers. A user can send and receive email messages, engage in instant messaging, chat, and surf the web using a set top box coupled with a display device such as a television set.

By connecting to the Internet through a computer or other processing device such as a set top box, users are able to perform many different functions. A user, for example, can check the traffic reports, view the latest news developments, print articles, shop, order tickets, listen to radio stations, view movie trailers, and the like. Users are often only restricted to the speed of their connection with the Internet.

Set top boxes, however, are not limited to providing users with access to the Internet. Some set top boxes, for instance, have the ability to digitally record television programs, which gives users flexibility regarding the television programs that they view. Programs are often recorded using electronic program guide (EPG) data that can be searched and viewed by the user. Once a program is identified from the EPG data, the set top box can be instructed to record that program. In addition to recording programs, set top boxes also permit users to set reminders, quickly retrieve recorded programs, fast forward through recorded programs, and other features that provide users with control over what they want to watch on the television set.

Another advantage of some set top boxes is the ability to let users directly interact with certain, enabled programs. For example, users may be able to participate with their favorite game shows, see local weather conditions during the weather forecast, access sports statistics during sporting events, research breaking news stories during the news hour, and the like while watching television. Set top boxes combine television programming with Internet data to provide more informative and entertaining television.

In spite of all the advantages provided by of set top boxes, providing interactive television is not without problems. Generally stated, the screen area of display devices becomes a scare resource when it is shared between multiple applications. In other words, the ability to display television programs and other content such as Internet data including interactive content must be balanced on the screen of the television set. This problem is significant because most people enjoy the advantages and functionality provided by set top boxes and do not want to turn those features off in order to watch a television program on a full screen.

Displaying data or other content associated with interactive television or with other set top box applications simultaneously with a television program limits the space that is available for displaying the television program. In other words, the television picture is minimized into a defined window and that small window is surrounded with interactive television controls or other content. As more interactive controls or content are added to the screen, the size of the television window will necessarily become smaller. At some threshold, the television window will still be visible, but watching television may not be enjoyable for the user. In this case, the user is faced with a choice. The user will either watch television in a small window or forego some of the advantages provided by the user interface that surrounds the small window.

Another approach is to provide a translucent overlay on top of a full screen television window that appears and disappears at the user's direction. In this case, the user's ability to view television is often distracted by the translucent overlay. Alternatively, the user can turn the overlay off and thus lose the advantages of interactive television, for example. For example, a user may be watching a sporting event while the overlay displays data related to other events. If the user turns the overlay off, then the user will not be able to interact with the sporting event. Alternatively, the overlay may interfere with the user's enjoyment and view of the current television program.

SUMMARY OF THE INVENTION

These and other problems are overcome by the present invention, which is directed to a user interface on a display device whose transparency is dynamically controlled by a user. The screen area of the display device is a scarce resource and the present invention overcomes the need to allocate the screen between content such as a television program or other video stream and content such as Internet data or interactive content. Therefore, in accordance with the present invention, a user is provided with the ability to control the visibility or transparency of a user interface or of portions of the user interface. The present invention also allows a user to control the visibility or transparency of the user interface and a video stream simultaneously.

A user interface is provided that can be simultaneously displayed with a video stream such as a television program in the same window as the video stream. The video stream may be displayed using all of the available display area of the display device. The user interface is also displayed on the display device, but the visibility or transparency of the user interface and/or the video stream is controlled by the user.

The ability to control the transparency or visibility of the user interface and/or the video stream ensures, for example, that the user is not distracted by the user interface when viewing the video stream. At the same time, the user interface is able to provide the user with content or data that would otherwise be unavailable to the user if the user interface were not present. At any time, the user can change the transparency of the user interface and/or the video stream for any reason. Another advantage of the present invention is the ability to control the transparency of selected items or content included in the user interface. This enables, for example, content along a certain portion of the display device, such as a border, to have no transparency, whereas items or content that are displayed more centrally on the display device can be configured to be more transparent. The transparency of the video stream/user interface is achieved by mixing the pixel data representing the video stream with the pixel data representing the user interface using an alpha value to control the relative strength or contribution of the respective pixel data.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more full apparent from the following description and appended claims, or may be learned by the practice of the invention as set fort h hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
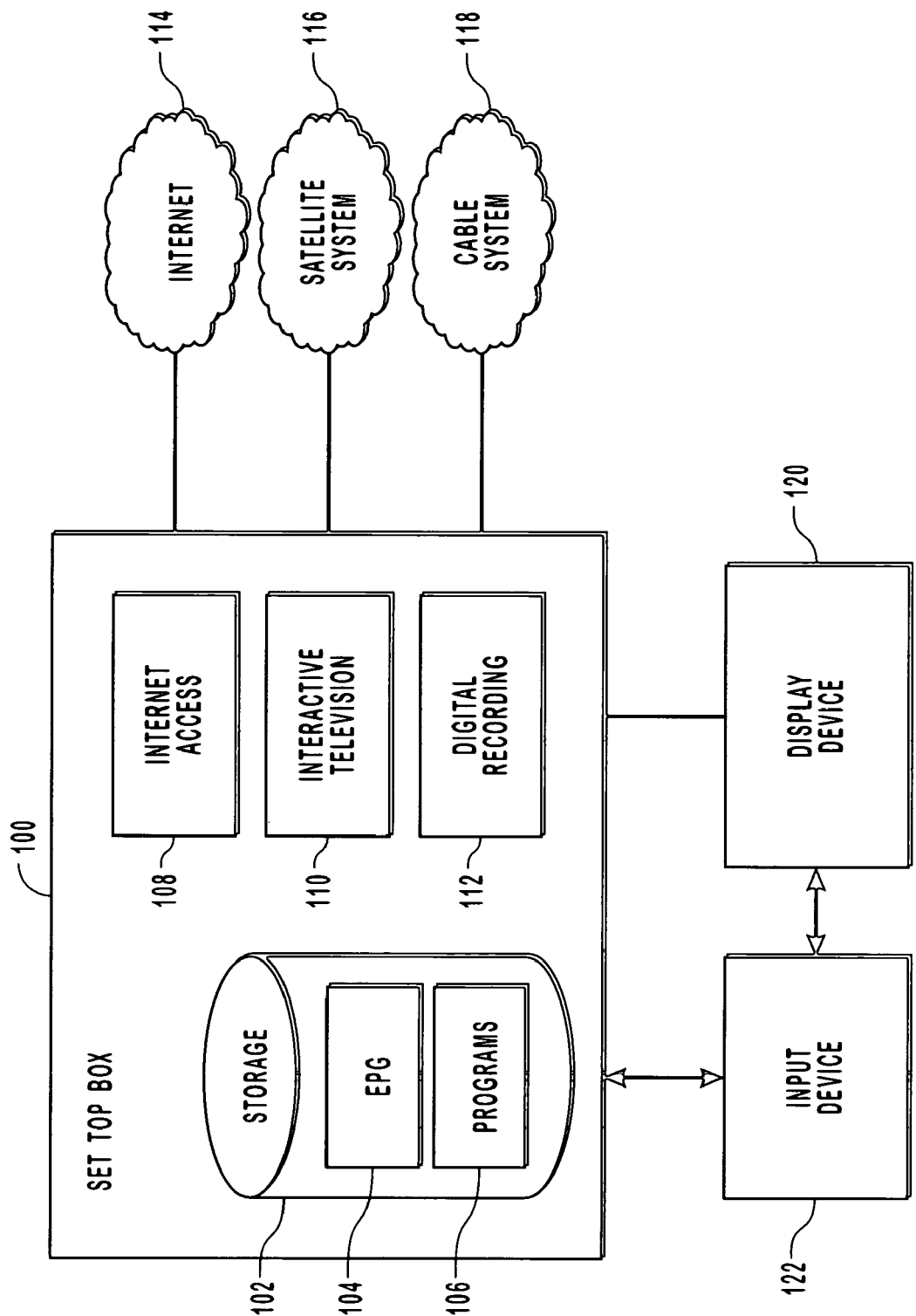
FIG. 1 is a block diagram of a suitable environment for implementing the present invention.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The present invention relates to a dimmable user interface. More particularly, the present invention relates to a user interface whose transparency or visibility is controlled by a user. The present invention also relates to simultaneously controlling the transparency of a video stream while controlling the transparency of a user interface. The variable oz transparency of both the user interface and/or the video stream allows the user interface to be simultaneously displayed with data such as a television program or other video stream, for example. Thus, the user is able to use and view the links, controls and other content presented through the user interface while viewing a video stream or other content.

Figure 2A:
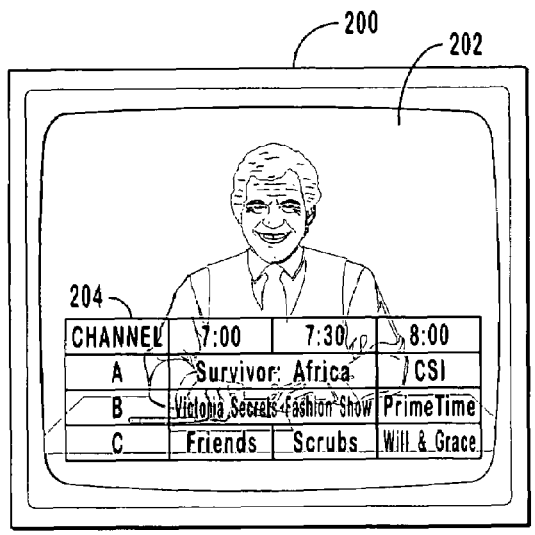
FIG. 2A is a screen shot illustrating a simultaneous display of a user interface and a video stream where the user interface has low transparency while the video stream has high transparency.
Figure 2B:
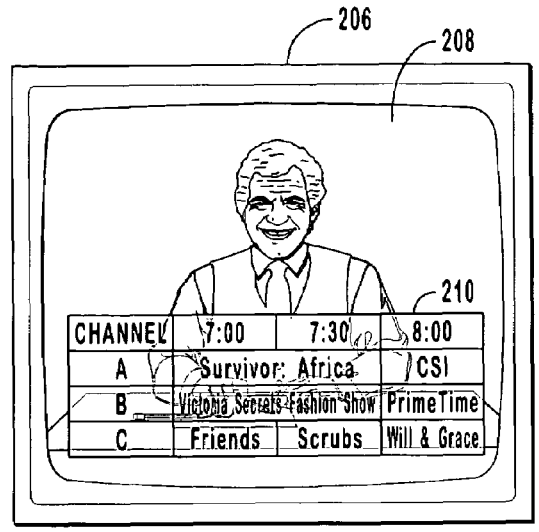
FIG. 2B is a screen shot illustrating a simultaneous display of a user interface and a video stream where the user interface has more transparency than the user interface of FIG. 2A and the video stream is more visible that the video stream of FIG. 2A.
Figure 2C:
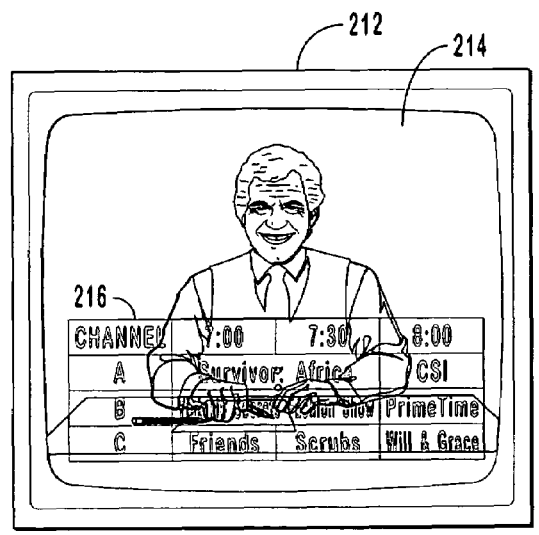
FIG. 2C is a screen shot illustrating a simultaneous display of a user interface and a video stream where the user interface has substantial transparency and the video stream has substantial visibility.
Figure 2D:
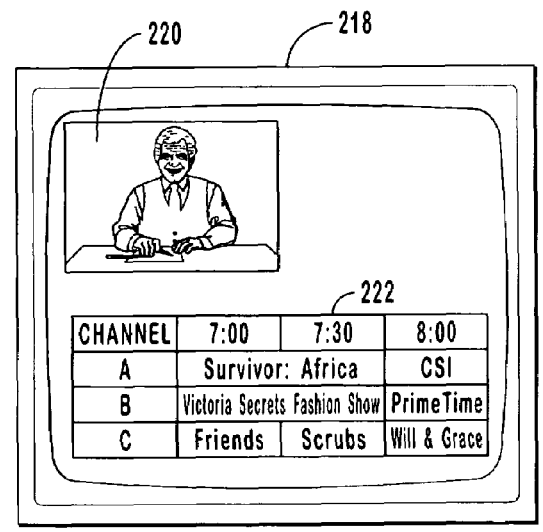
FIG. 2D is a screen shot illustrating a simultaneous display of a user interface and a video stream where the video stream has been resized to a small window of the display device.

One advantage of the present invention is that it eliminates the need to balance the available screen area of the display device between the television program and the user interface (as shown in FIG. 2D). Because the transparency of the user interface is user controllable, the user can adjust the transparency to a level that makes viewing and/or surfing more comfortable to the user. In other words, the user is still able to enjoy a full screen display of their television programs or other video and the user is not distracted by the user interface because the user has adjusted the transparency of the user interface according to the user's preference. Typically, the transparency of both the video stream and the user interface are adjusted simultaneously because the pixel data of representing the user interface and the pixel data representing the video stream are mixed using alpha values that are determined from the user input. As the transparency of the user interface is increased, the transparency of the video stream is decreased and vice versa. In this situation, the user interface is not visible when the video stream has zero transparency and the video stream is not visible when the user interface has zero transparency.

FIG. 1 is a block diagram of one exemplary suitable environment for implementing the present invention. The present invention can be practiced in a number of set top boxes that have different configurations and different computing abilities. The set top box 100 may be, for example, a special purpose computer or a general purpose computer, a cable television box, DSS/DVB, DVD, an Internet terminal, a video game system, a satellite receiver, and the like or any combination thereof. While the present invention is described in terms of a set top box, it is clear to one of skill in the art that the present invention may be practiced in other devices including, but not limited to, cellular telephones, personal digital assistants, and the like. Each of these devices can accommodate the present invention as described herein.

FIG. 1 illustrates that the set top box 100 is connected with exemplary sources of data or content. In this example, the sources include the Internet 114, a satellite system 116, and a cable system 118. The set top box 100 typically connects to the sources using, for example, standard telephone lines, Integrated Services Digital Network (ISDN) lines, cable lines and satellite connections.

The set top box 100 uses the Internet 114, for example, to surf the Web, send/receive email, chat, video conference, instant message, and the like or any combination thereof. The Internet 114 is also used in some instances for interactive television programs. Over the satellite system 116 and the cable system 118, the set top box 100 receives television content or programming content. In some instances, other content such as radio or music content is accessible through these sources. It is understood that other types of content may also be accessed or delivered through these and other sources.

The set top box 100 of FIG. 1 is connected with a display device 120 such as a television set, a computer monitor, a high definition television display, a flat panel display, a projection device, or any other device capable of displaying video data or content. In some examples, the display device 120 is an integral part of the set top box 100.

The set top box 100 and/or the display device 120 are controlled with an input device 122. The input device 122 may be a keyboard, a remote control or other device that permits a user to interact with the set top box 100 and/or the display device 120 and that permits a user to send instructions to the set top box or the display device. The set top box 100 includes a storage 102, which may be a hard drive or other memory.

The set top box stores, for example, EPG data 104 and programs 106 on the storage 102 as well as applications that can access and use the data stored on the set top box. The EPG data 104 typically contain information about television programs and includes, but is not limited to, program titles, program channels, program duration, program start and end times, and the like or combinations thereof. The stored programs 106 are often recorded from the video content delivered by the satellite system 116 or the cable system 118. This enables a user to use their set top box to record various television programs for later viewing, for example.

FIG. 1 also illustrates exemplary functions of the set top box 100, although any particular set top box 100 is not required to have all of these functions. The set top box 100 has Internet access 108 to the Internet 114. In some instances, the Internet 114 may be accessed through another network or system, such as a local area network or the cable system 118. The connection between the set top box 100 and the Internet 114 may be a dial up connection, a cable modem connection, or other connection. The set top box 100 of this example also provides interactive television 110 and the ability to digitally record (112) television programs.

With interactive television 110, Internet access 108, digital recording 112, and other functions or capabilities of the set top box 100, a user is able to pause and record television shows, search the EPG data using a variety of parameters and record shows based on those parameters (by show type, title, actor, etc.), search the Internet while watching television, listen to the radio, interact directly with a television program that is currently being watched, and the like or any combination thereof. It is understood that these are exemplary abilities or functions of a set top box, and the set top box described herein is not limited to these abilities and functions.

FIGS. 2A through 2D illustrate the present invention in terms of an application that displays guide data on the display device. However, the present invention is not limited to this application. For example, the present invention is useful in applications that display help screens. In this example, the transparency of the help screen and the application can be adjusted such that the user can view the application while viewing the help screen. In other words, the user is not required to hide or minimize the application while viewing the help screen. The present invention has similar application for a DVD interface. This enables a user to take advantage of DVD features while still viewing the recorded video. In general, the present invention can be utilized to simultaneously display a plurality of data from multiple sources where the transparency of the data from each source can be adjusted.

The transparency that the user adjusted is often related to a cursor, selector or other visual indicator that identifies the content that is currently selected. When the transparency of a particular item is being adjusted as described herein, the cursor or selector can identify that item. Alternatively, the user input that represents a change in transparency can be applied to the entire user interface/video stream.

FIG. 2A through FIG. 2D are block diagrams that illustrate a user interface whose transparency or visibility is controlled by a user. The methods for adjusting or changing the transparency of the user interface and/or selected items in the user interface are described with reference to FIG. 4. FIG. 2D illustrates a previous solution to this problem, where the video 220 is minimized and effectively separated from the user interface 222. In the example of FIG. 2D, both the video 220 and the user interface 222 are visible to the user on the display device 218, but the video 220 is small and more difficult to view.

FIGS. 2A through 2C, however, illustrate a display device that is simultaneously displaying a video stream and a user interface in the same window, which is usually the entire display of the display device. FIGS. 2A through 2C illustrate how the balance between the user interface and a video stream changes with respect to each other. In FIG. 2A, the video stream 202 has high transparency while the user interface 204 has low transparency. In FIG. 2B, the video stream 208 and the user interface 210 have approximately the same level of transparency. FIG. 2C is the opposite of FIG. 2A and FIG. 2C illustrates the situation where the user interface 216 has high transparency while the video stream 214 has low transparency. FIG. 2A can be extended to the situation where the video stream is not visible and the user interface has no transparency and FIG. 2C can be extended to the situation where the user interface is not visible and the video stream has no transparency. In this embodiment, a balance exists between the user interface and the video stream. As the transparency of one layer (user interface or video stream) increases, the transparency of the other layer decreases. The user also has the ability to control the transparency as described above with respect to specific content in addition to globally controlling the transparency of the user interface/video stream.

Alternatively, the present invention contemplates those situations where the transparency of one layer is controlled independent of the other layer. For example, the video stream may always be visible at a certain level, while the user can adjust the transparency of the user interface or vice versa.

In FIG. 2A, a display device 200 is displaying a video stream 202 and a user interface 204. In this instance, the video stream 202 may be a live television program, a recorded program, or any other video stream. The user interface 204 in this example is a user interface that displays EPG data. From the EPG data, for example, the user may select a program to be recorded or browse available programming while viewing the current program.

In FIG. 2A, the video stream 202 and the user interface are being displayed simultaneously and the video stream 202 is using all of the available screen area of the display device 200. The user interface 204, as illustrated in FIG. 2A however, has little transparency or, in other words, has high visibility. In this example, the video stream 202 has relatively high transparency. Alternatively, only a portion of the video stream 202 is visible to the user while the rest of the video stream 202 is obscured by the user interface 204.

FIG. 2B illustrates a display device 206 that is simultaneously displaying a video 208 and a user interface 210. This is similar to FIG. 2A, except that the user interface 210 is more transparent than the user interface 204 of FIG. 2A. Because the user interface 204 is more transparent, the user is able to use the entire screen of the display device 206 to view the video 208 while simultaneously viewing the user interface 210. In this example, the transparency of the video stream 208 has been reduced while the transparency of the user interface 210 has been increased. The respective levels of transparency between the user interface 210 and the video stream 208 represents a spectrum where the level of transparency of the video stream 208 is effectively opposite the level of transparency of the user interface 210. In FIG. 2B, the video stream 208 and the user interface 210 have approximately the same level of transparency.

FIG. 2C further illustrates a user interface and/or a video stream whose transparency is user controlled. In FIG. 2C, the user interface 216 is very transparent compared to the user interfaces illustrated in FIGS. 2A and 2B. In this example, the user is likely not distracted by the user interface 216 and is able to take advantage of the full screen of the display device 212 and display a full size video 214. The user, of course, has the ability to change the transparency or visibility of the user interface and/or the video stream at any time.

A user interface whose transparency is variable can be applied to other aspects or functionality of the set top box and is not limited to the EPG data. For example, Interactive television also benefits from a dimmable user interface. A user is able to access and surf the Internet while watching a video or a television program. A user will be able to access the Internet to retrieve statistics, for example, while watching a sporting event. The user will be able to research news stories as they happen using interactive television technology. A user will be able to schedule the set top box to record a program on a different channel while watching a current program. These tasks and more can all be accomplished without having to resize the video window.

The user interface can be dimmed at the user's discretion. The ability to have a dimmable user interface overcomes the limitation of balancing the screen between the video and the user interface. In this example, the user interface is always present and can be made more visible or less visible as needed. However, the present invention does not require the presence of the user interface. A user, for example, may simply be watching television through the set top box.

Figure 3:
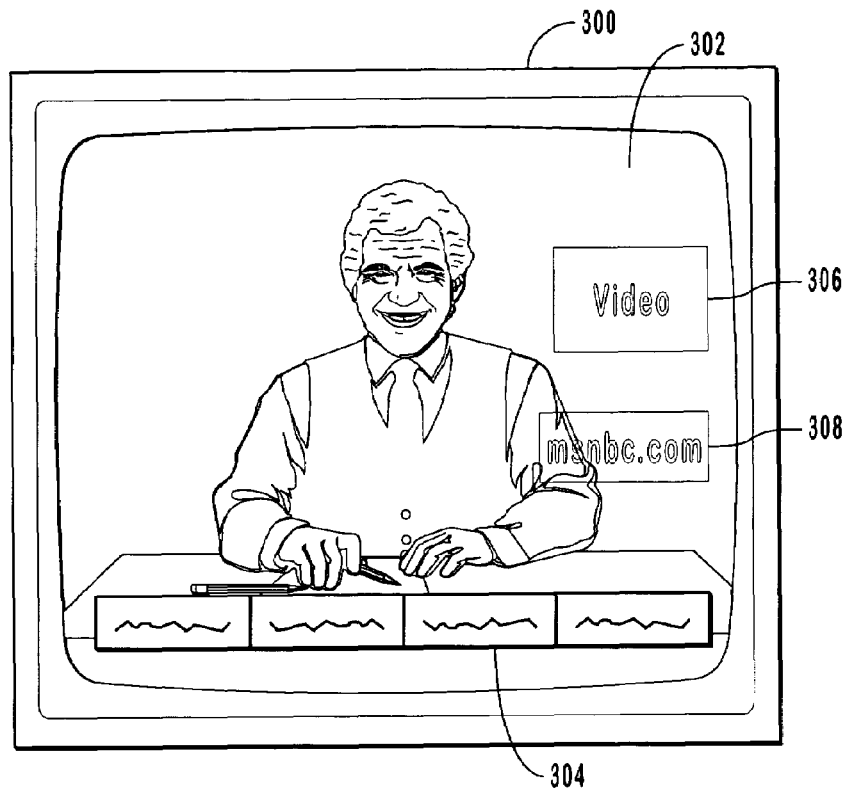
FIG. 3 is a block diagram illustrating a situation where selected items or selected content has substantial transparency while other items have a different level of transparency.

FIG. 3 is a block diagram illustrating a user interface where selected items, content or elements of the user interface are dimmed rather than the dimming the entire user interface. In this example, the video 302 is displayed using the entire screen area of the display device 300. However, the item 306, which is a streaming video link to the Internet in this example, has been selected and made more transparent. The portion of the video that occupies the same space as the item 306 has its transparency adjusted simultaneously. Similarly, the link 308 has also been made more transparent in order to enhance the user's view of the video 302.

The user has not dimmed the item 304, however. One reason may be that the item 304 does not interfere with the user's view of the video 302. In one example, the item 304 may be a stock ticker or may provide scores of sporting events that have been specifically identified by the user. The user interface of FIG. 3 has content or items that can be individually selected and dimmed. In addition, the user interface as a whole may be made more or less transparent. Thus each item may have its own level of transparency while the user interface as a whole has a global level of transparency.

Figure 4:
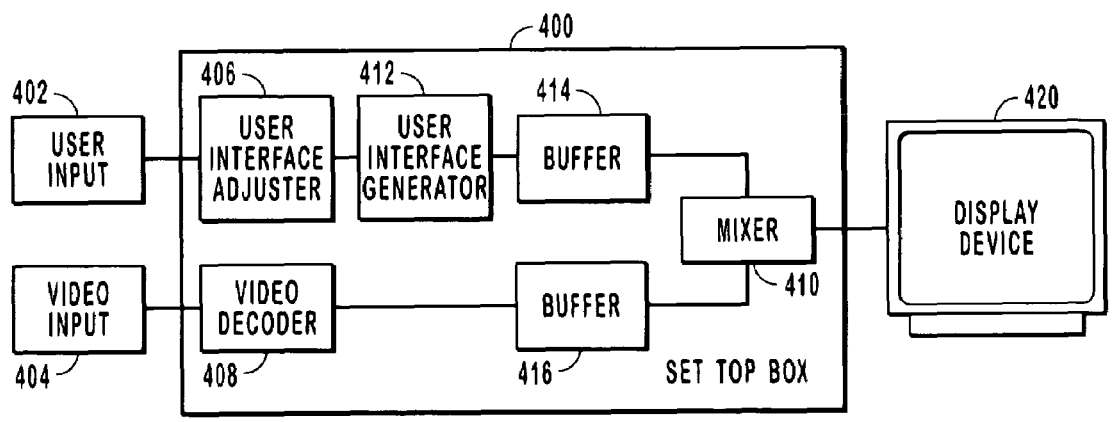
FIG. 4 is a block diagram illustrating a set top box that permits a user to control the transparency of a user interface that is simultaneously displayed with other data.

FIG. 4 is a block diagram that illustrates one example of how the transparency of the user interface/video stream or of items or portions of the user interface/video stream may be controlled. The set top box 400 includes a video decoder 408 and a user interface (UI) adjuster 406. The UI adjuster 406 receives user input 402, which in this example, represents a change in transparency as previously described and the user input 402 received by the UI adjuster 406 is utilized by the UI generator 412 when creating the pixel data of the user interface. The UI generator 412 thus generates pixel data from the graphics and other data that is included in the user interface while applying the user input 402 from the user interface adjuster 406 to the pixel data that is being generated. The pixel data thus created includes, for example, RGB data (or data for a different color scheme) and an alpha value. The alpha value is representative of the relative transparency of the user interface/video and controls how the pixel data is mixed with other pixel data. The pixel data created by the UI generator 412 is written to a buffer 414.

The video decoder 408 decodes a program from the video input 404. The video decoder 408 also generates pixel data that is stores in a buffer 416. A mixer 410 generates screen data by combining the pixel data stored in the buffer 416 with the pixel data stored in the buffer 414. Because the buffer 414 represents pixel data of a user interface, the buffer 414 is more static and may be utilized by the mixer 410 more than once. The pixel data in the buffer 416, however, is likely representative of a single frame and is continually changing to reflect the newly decoded frames received from the video decoder 408. The screen data generated by the mixer reflects the user input 402. If the mixer 410 is capable, for example, of generating 256 levels of transparency (assuming that alpha is between 0 and 255), then the screen data is a combination of the buffer 414 and the buffer 416 as follows: ((buffer 414\*alpha)+(buffer 416\*(256−alpha))). The alpha value can be applied to particular pixels or groups of pixels or can be applied to the entire buffer. It is understood that the present invention is not limited to 256 levels of transparency as illustrated in this example. It is also understood by one of skill in the art that a buffer may not be required in some instances and the pixel data may be written or sent to the mixer 410 directly. In this manner, the screen data is generated by combining the pixel data of the video input with the pixel data of the user interface. In other words, the screen data is generated by mixing the user interface with a video stream and the ability to view either the user interface and/or the video stream is dependent on the respective levels of transparency that are determined from the alpha values. When the level of transparency of the user interface is adjusted, the level of transparency of the video stream is simultaneously adjusted accordingly.

While FIG. 4 illustrates that the mixer 410 is combining data from the user interface generator 412 and a video decoder 408, it is understood that the present invention is not limited to these sources of data. For example, one source of data may be an application and the other source of data may be from another application or from a related application. For example, one source of data may be a word processing program while the second source of data may be a help application for the word processing program. The present invention would enable the user to control the transparency of the data displayed for these two applications. In these situations, both sources of data are mixed by the mixer 410 while the transparency of the respective applications is controlled by the user. One of skill in the art will understand that the present invention can be applied similarly to other sources and types of data that are mixed and displayed on a display device.

The screen data generated by the mixer 410 is displayed on the display device 420. Often, a level of transparency for the user interface is already present and available to the set top box. This level of transparency is usually applied to the user interface. At the same time, in one example, a level of transparency is also applied to the video stream 302. The levels of transparency of the user interface and the video stream are connected and change as described previously. Thus, when the user is increasing the transparency of the user interface, the transparency of the video is implicitly changing as well.

The user input 402, which is often received from an input device such as a remote control, is added to the mixer 410. The user input 402 is used by the mixer 410 to adjust the transparency of the user interface and/or the video stream. By providing the user input 402 to the set top box 400 or to the mixer 410, a user can adjust the transparency of the user interface on the video as shown with reference to FIGS. 2A through 2D, and FIG. 3. The user can increase or decrease the transparency of the user interface.

The user also has the ability to adjust the transparency of individual items or elements of the user interface. After the user selects an item, the level of transparency for that item can be adjusted. In one example, the global level of transparency for the user interface is unchanged in this case.

The transparency of the user interface or of selected portions or elements of the user interface can be controlled using various methods. In many situations the set top box receives user input via an input device. In one example, an onscreen transparency control is provided through the user interface. In one embodiment, the transparency control represents a balance between the transparency of the user interface and the video stream. As the balance control is altered the transparencies of the user interface and the video change accordingly. If the user, for example, increases the transparency of the user interface, the transparency of the video stream is decreased and vice versa using the transparency control. In this scenario, the existing navigation buttons of an input device change the on screen selection to the transparency control icon. Once the transparency control is selected, the scroll up/down buttons, for example, can be used to adjust the transparency of the user interface/video stream or of selected items or elements in the user interface.

In another example, selected buttons on the input device can be altered or programmed to perform additional functions. For example, some buttons like a mute button, are press and release buttons. A user presses and releases the mute button in order to mute the audio. Currently, pressing and holding the mute button does not perform any function. However, this functionality can be added such that pressing and holding the mute button would increase/decrease the transparency of the user interface/video stream. Another button on the input device could be similarly altered in order to work in tandem with the mute button to decrease/increase the transparency of the user interface/video stream.

Alternatively the function of a pair of buttons on the input device could be changed according to context. For example, the volume button may be used to increase/decrease the transparency of the user interface/video stream instead of adjusting the volume when the set top box is in the context of adjusting the transparency of the user interface. Another solution is to add additional buttons to the input device that control the transparency of the user interface/video stream.

In another example where the input device is, for example, a computer mouse, controlling the transparency can be achieved by moving the cursor to a corner of the screen and using the scroll wheel. Alternatively, an extra button on the mouse can be depressed while the scroll wheel is used to control the transparency. In other situations, a button can be programmed to control the respective transparency of the displayed data.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system that is capable of receiving a video stream and that is also capable of displaying the video stream and a user interface on a display device, the computing system comprising:

one or more computer-readable storage media having stored computer-executable instructions for implementing a method for displaying and controlling transparency of the user interface and the video stream, the method comprising:

generating screen data by mixing a user interface and a video stream;

displaying the screen data in a display window on the display device, wherein a view of the video in the display window is dependent on a level of transparency of the user interface;

wherein the system includes both:

means for adjusting the level of transparency of the user interface and a level of transparency of the video simultaneously, such that adjusting the level of transparency of the user interface necessarily adjusts the level of the video, and means for adjusting the level of transparency of the user interface independently of the level of transparency of the video and such that adjusting the level of transparency does not affect the level of transparency of the video;

receiving input from a user, wherein the input controls the level of transparency of the user interface; and adjusting the level of transparency of the user interface on the display device according to the input received from the user, wherein adjusting the level of transparency of the user interface includes selectively adjusting the level of transparency of the user interface independently or simultaneously with the level of transparency of the video.

2. A computing system as defined in claim 1, wherein generating screen data by mixing a user interface and a video stream further comprises mixing the user interface with the video stream according to a current level of transparency.

3. A computing system as defined in claim 1, wherein receiving input from a user further comprises receiving input from an input device controlled by the user.

4. A computing system as defined in claim 3, wherein adjusting the level of transparency of the user interface further comprises adjusting a level of transparency of the video stream, wherein the level of transparency of the video stream increases if the level of transparency of the user interface decreases and wherein the level of transparency of the video stream decreases if the level of transparency of the user interface increases.

5. A computing system as defined in claim 3, wherein adjusting the level of transparency of the user interface further comprises making the user interface either more transparent or less transparent.

6. A computing system as defined in claim 1, wherein the user interface comprises one or more items that each have a level of transparency, wherein the method further comprises adjusting a level of transparency for a selected item without adjusting levels of transparency for non-selected items.

7. A computing system as defined in claim 1, wherein adjusting the level of transparency of the user interface further comprises displaying a transparency control on the display device, wherein the transparency control is used to select a level of transparency that is applied to the user interface.

8. A computing system as defined in claim 1, wherein generating screen data further comprises retrieving content from a network, wherein the content is included in the user interface.

9. A computing system as defined in claim 1, wherein generating screen data further comprises at least one of:
receiving the video stream from a cable system;
receiving the video stream from a satellite system;
receiving the video stream from a network; and
retrieving the video stream from a storage of the set top box.

10. A computing system as defined in claim 1, wherein the user interface includes interactive elements related to the video stream.

11. A computing system as defined in claim 1, wherein displaying the screen data on the display device further comprises:
displaying the video stream using an entire screen of the display device; and
displaying the user interface using the entire screen of the display device.

12. A computing system that is capable of receiving a video stream and that is also capable of displaying the video stream and a user interface on a display device, the computing system comprising:

one or more computer-readable storage media having stored computer-executable instructions for implementing a method for displaying a user interface that has one or more selectable items and video content in a single window, the method comprising:

displaying the user interface and the video content in the window, wherein the user interface includes a plurality of different selectable items, and wherein a global level of transparency is associated with the user interface, and such that adjusting the global level of transparency simultaneously adjusts transparency of each of the different selectable items of the user interface;

selecting one of the plurality of different items included in the user interface, wherein the selected item has a level of transparency that is independent of the global level of transparency; and adjusting the level of transparency of the selected item according to input received from a user, the input comprising selection of one or more buttons on a remote control device, wherein the level of transparency of the selected item is adjusted independently of the global level of transparency, such that when the level of transparency of the selected item is adjusted, the global level of transparency remains unchanged.

13. A computing system as defined in claim 12, wherein selecting an item included in the user interface further comprises:
selecting multiple items in the user interface; and
simultaneously adjusting the levels of transparency for each of the selected items without affecting the global level of transparency.

14. A computing system as defined claim 12, wherein the method further comprises adjusting the global level of transparency of the user interface according to input received from a user.

15. A computing system as defined in claim 14, wherein displaying the user interface and the video content in the window further comprises generating screen data by mixing the user interface with the video content.

* * * * *